United States Patent
Andarawis et al.

(10) Patent No.: US 7,332,915 B2
(45) Date of Patent: Feb. 19, 2008

(54) SENSOR SYSTEM AND METHOD OF OPERATING THE SAME

(75) Inventors: Emad Andarawis Andarawis, Ballston Lake, NY (US); Samhita Dasgupta, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/951,562

(22) Filed: Sep. 28, 2004

(65) Prior Publication Data

US 2006/0066318 A1 Mar. 30, 2006

(51) Int. Cl.
*G01R 27/26* (2006.01)

(52) U.S. Cl. .......................... 324/662; 324/690
(58) Field of Classification Search ............. 324/662, 324/690, 660
See application file for complete search history.

(56) References Cited

U.S. PATENT DOCUMENTS

| | | | |
|---|---|---|---|
| 5,101,165 A | 3/1992 | Rickards | 324/662 |
| 5,119,036 A | 6/1992 | Rickards et al. | 324/662 |
| 5,166,626 A | 11/1992 | Hester et al. | 324/690 |
| 5,910,781 A * | 6/1999 | Kawamoto et al. | 340/870.37 |
| 6,401,541 B1 | 6/2002 | Kurtz | |
| 6,441,623 B1* | 8/2002 | Moon | 324/661 |
| 6,593,755 B1* | 7/2003 | Rosengren | 324/677 |
| 6,744,264 B2* | 6/2004 | Gogoi et al. | 324/658 |
| 6,876,209 B2* | 4/2005 | Lin et al. | 324/660 |
| 2003/0011378 A1* | 1/2003 | Ishio et al. | 324/519 |
| 2005/0077911 A1* | 4/2005 | Miyasaka | 324/662 |

FOREIGN PATENT DOCUMENTS

| | | |
|---|---|---|
| DE | 4119244 | 12/1992 |
| JP | 2005134131 | 12/2003 |
| SU | 964437 | 10/1982 |

* cited by examiner

*Primary Examiner*—Andrew H. Hirshfeld
*Assistant Examiner*—Jeff Natalini
(74) *Attorney, Agent, or Firm*—Fletcher Yoder

(57) ABSTRACT

A sensor system comprising a sensor operable to provide an output signal representative of a sensed parameter is provided. The sensor system also comprises a control system coupled to the sensor, wherein the control system is operable to change a physical characteristic of the sensor based on the output signal representative of the sensed parameter.

23 Claims, 3 Drawing Sheets

SENSOR SYSTEM AND METHOD OF OPERATING THE SAME

BACKGROUND

The invention relates generally to sensor systems and, more particularly, to a sensor system that is operable to adjust a physical characteristic of a sensor in response to an output of the sensor.

Various types of sensors have been used to measure the distance between two objects. In addition, these sensors have been used in various applications. For example, a turbine has a turbine blade that is disposed adjacent to a shroud. The clearance between the turbine blade and the shroud varies depending on the temperature of the turbine blade. For example, the clearance between the shroud and the turbine blade is greatest when the turbine is cold and gradually decreases as the turbine heats up. It is desirable that a gap or clearance between the turbine blade and the shroud be maintained for safe and effective operation of the turbine. A sensor may be disposed within the turbine to measure the distance between the turbine blade and the shroud. The distance may be used to direct movement of the shroud to maintain the desired displacement between the shroud and the turbine blade.

In certain applications, a capacitance probe is employed to measure the distance between two objects. Conventionally, the dimensions of the capacitance probe tip are selected to correspond to a single displacement distance between the two objects. Small probes are typically limited to small distance measurements, as a result of the signal to noise ratio. Similarly, large probes are typically limited to large distance measurements because they provide poor resolution of the distance between the two objects for small distance measurements. As a result, conventional capacitance probes may be inaccurate at displacement distances other than the displacement distance for which the probe tip was designed.

Accordingly, there is a need to provide a sensor system that would accurately measure the clearance between two objects that are displaced relative to each other over an entire range of displacement.

BRIEF DESCRIPTION

Briefly, in accordance with one aspect of the present invention a sensor system is provided. The sensor system comprises a sensor operable to provide an output signal representative of a sensed parameter. The sensor system also comprises a control system coupled to the sensor, wherein the control system is operable to change a physical characteristic of the sensor based on the output signal representative of the sensed parameter.

In accordance with another aspect of the present invention a method of operating a sensor system is provided. The method comprises receiving an output signal representative of a sensed parameter via a sensor and controlling a physical characteristic of the sensor based on the output signal representative of the sensed parameter.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
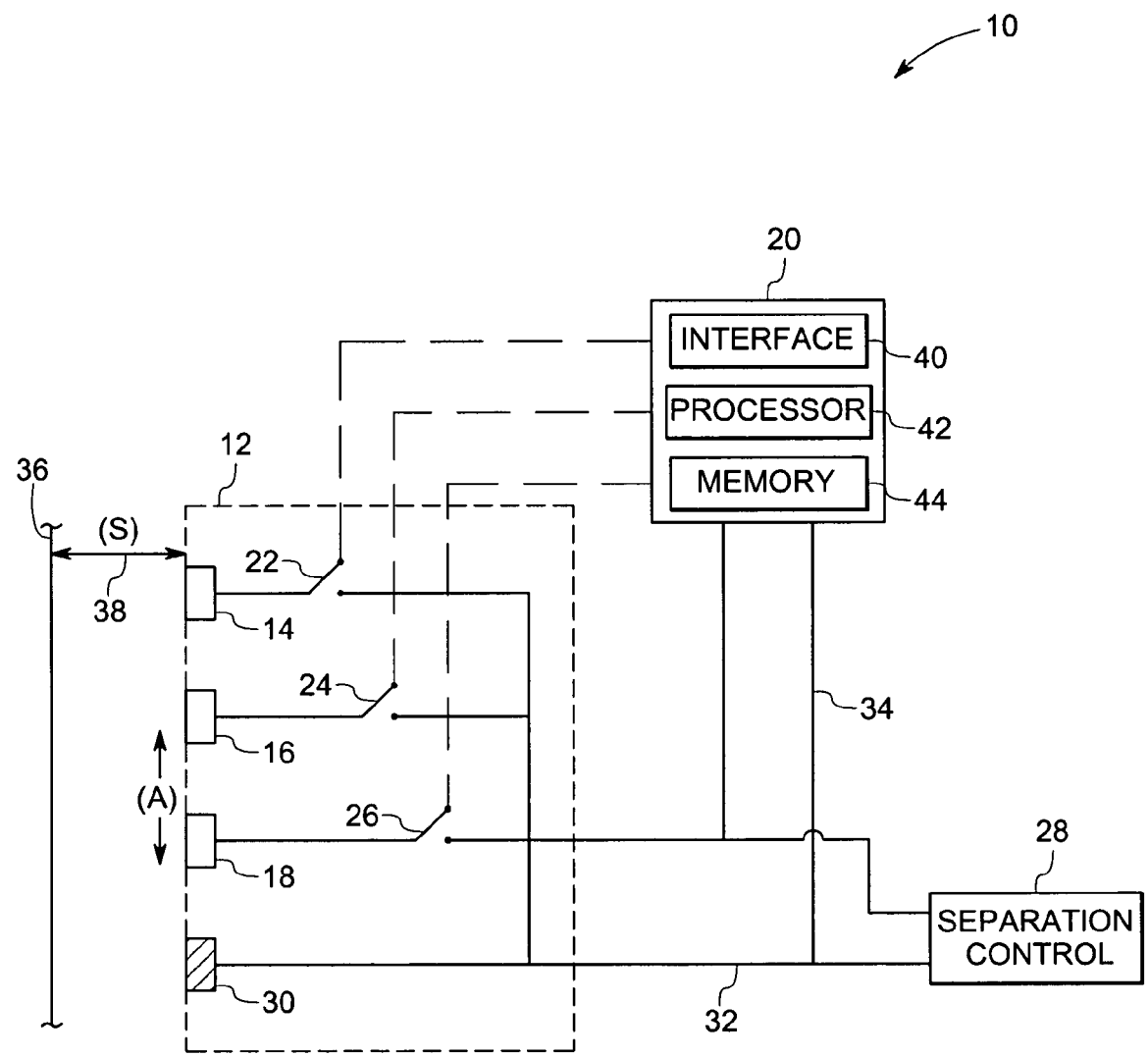
FIG. 1 is a diagrammatical representation of a sensor system for clearance measurement in a rotating machine, in accordance with an exemplary embodiment of the present technique.

Referring now to FIG. 1, a sensor system is provided, and represented generally by reference numeral 10. The sensor system 10 comprises a probe 12 operable to provide an output signal representative of a sensed parameter. The probe 12 comprises a first conducting element 14, a second conductive element 16, and a third conductive element 18. However, a lesser or greater number of conductive elements may be used in the sensor system 10. In addition, the illustrated embodiment of the sensor system 10 comprises a probe control system 20, a first switch 22, a second switch 24, and a third switch 26 for selectively coupling the conducting elements 14, 16 and 18 to the probe control system 20. As described in greater detail below, the probe control system 20 is operable to optimize the configuration of the probe 12 based on the output of the probe 12 by selectively coupling the conductive elements 14, 16, and 18 together. The conducting elements 14, 16 and 18 are also coupled to a separation control system 28 that is operable to control the separation between the probe 12 and a target that will also be described in detail below. An additional conductive element 30 is provided to act as a return path and to shield the probe 12 from noise and interference. However, a greater number of conductive elements may be coupled to the conductive element 30 for shielding the probe 12. Further, the conductive elements 14, 16 and 18 are coupled to the separation control system 28 and the probe control system 20 via cables 32 and 34, respectively.

In the illustrated embodiment, the probe 12 is a capacitance probe that senses the capacitance between the probe 12 and an object 36. The capacitance between two objects is a function of the overlap surface area (A) and the separation (S) 38 between the probe 12 and the object 36. In the sensor system 10, the overlap surface area (A) is the area of the probe 12 because the area of the object 36 is greater than the area of the probe 12. The capacitance between two parallel plates is given by the following equation:

$$C = \epsilon A/S \quad (1)$$

Where: C is the capacitance;
$\epsilon$ is the permittivity of a medium between the parallel plates;
A is the overlap area between the parallel plates; and
S is separation of the parallel plates.

By sensing the capacitance (C), the probe 12 enables the separation (S) 38 between the probe 12 and the object 36 to be established. By manipulating equation (1) above, the following equation relates the separation (S) to the capacitance (C).

$$S = \epsilon A/C \qquad (2)$$

As discussed in more detail below, the separation control system 28 is operable to control the separation (S) 38 between the probe 12 and the object 36 based on a signal representative of the capacitance (C) received from the probe 12. In this embodiment, the separation control system 28 is operable to establish the separation (S) 38 between the probe 12 and the object 36 using equation (2) above and data programmed into the separation control system 28. However, the separation control system 28 may simply use the capacitance (C) to control the separation (S) 38 between the probe 12 and the object 36. The capacitance (C) and/or the separation (S) are compared to a desired value of the capacitance and/or the separation (S). In this embodiment, the separation control system 28 is operable to direct the displacement of the object 36 to maintain the desired capacitance (C) or separation (S).

The probe control system 20 is operable to optimize the area (A) of the probe 12 to correspond to the actual separation (S) 38 or capacitance (C). The probe control system 20 decreases the area (A) of the probe 12 as the separation (S) 38 decreases and increases the area (A) of the probe 12 as the separation (S) 38 increases. The probe control system 20 controls the area (A) of the probe 12 by selectively closing the switches 22, 24 and 26, thereby controlling the specific conductive elements 14, 16 and 18 that are coupled to the separation control system 28. For example, if the separation (S) 38 between the probe 12 and the object 36 is small, the probe control system 20 may couple a single conductive element 18, other than the return path 30, to the separation control system 28 by closing switch 26 and opening switches 22 and 24. Alternatively, as the separation (S) 38 between the probe 12 and the object 36 increases, the probe control system 20 may operatively couple conductive elements 14 and 16 to the separation control system 28 by closing switches 22 and 24.

In the illustrated embodiment, the probe control system 20 comprises an interface 40 for facilitating control of the switches 22, 24, and 26. In addition, the probe control system 20 also comprises a processor 42 for processing the capacitance signal from the probe 12 and directing the interface to selectively open and close the switches 22, 24, and 26. In this embodiment, the probe control system 20 also includes a memory circuitry 44 for storing pre-defined programs, internal references, and other information for controlling the selectively coupling of the conductive elements 14, 16 and 18.

As described above, switches 22, 24 and 26 are employed for coupling the conductive elements 14, 16 and 18 to the probe 12. In one embodiment, the switches 22, 24 and 26 comprise solid-state switches. In another embodiment, the switches 22, 24 and 26 may comprise mechanical relays. In yet another embodiment, the switches 22, 24 and 26 may comprise radio frequency micro-electromechanical systems switches. It should be noted that, coupling of additional conductive elements 16 and 18 via the switches 24 and 26 enhances a range of measurement of the probe 12. In another embodiment, when the conductive elements that are not being utilized to be coupled together may be coupled to the conductive element 30 to provide additional shielding. In another embodiment, the unused conductive elements may be held at a pre-determined potential to reduce interference in the measurement.

Figure 2:
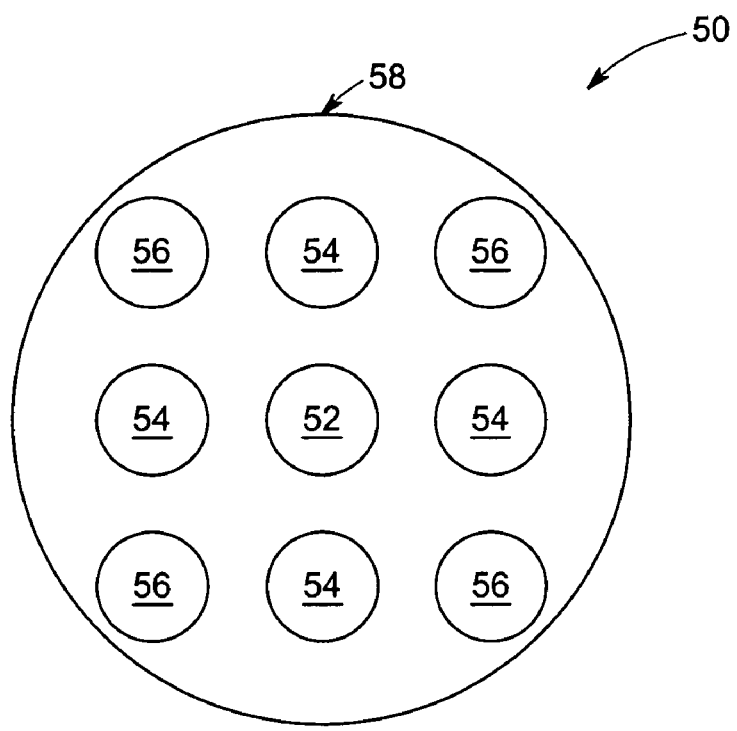
FIG. 2 is a diagrammatical representation of a sensor with a patterned array of sensor elements, in accordance with an exemplary embodiment of the present technique.
Figure 3:
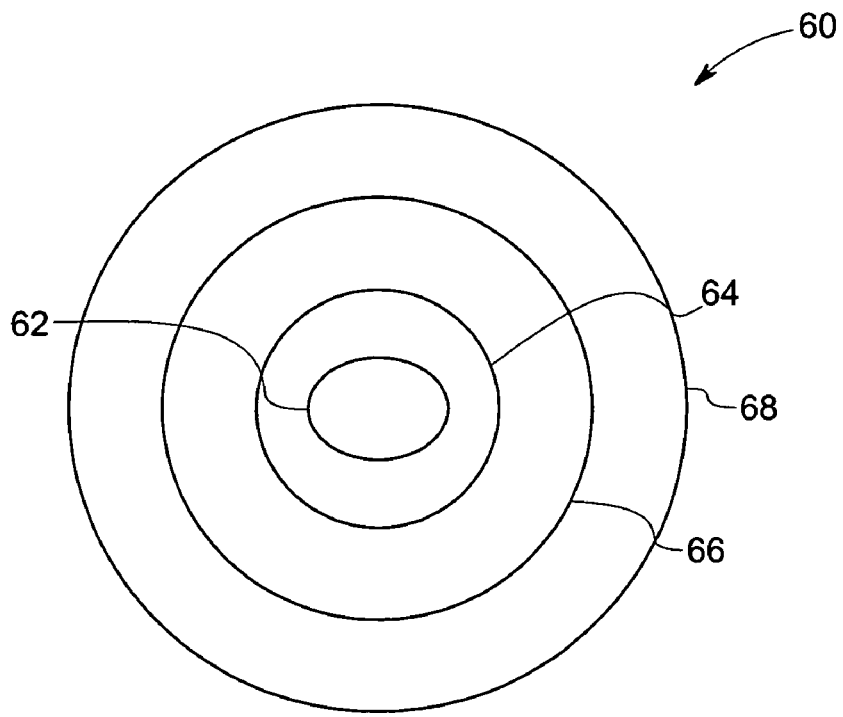
FIG. 3 is a diagrammatical representation of a sensor with an annular array of sensor elements, in accordance with an exemplary embodiment of the present technique.

Referring generally to FIGS. 2 and 3, various types and configurations of conductive elements that may be implemented for the sensor system of FIG. 1 are provided. As illustrated in FIG. 2, a first probe 50 is provided in which the conductive elements are conductive shafts. The conductive shafts comprise a center conductor 52, a first group of conductive elements 54, and a second group of conductive elements 56 that are arranged in a pre-determined pattern. The center conductive element 52 may be coupled to the probe 12 for all ranges of measurement by the probe 12. The first group of conductive elements 54 may be coupled to the center conductor 52 to increase the area (A). If additional area is need, the second group of conductive elements 56 may be coupled to the center conductor 52 and to the first group of conductive elements 54. However, other configurations may be used. An outer conductive element 58 is disposed around the conductive elements 52, 54, and 56 to act as a return path and to shield the conductive elements 52, 54, and 56 from electrical noise and interference. In an alternative embodiment, any unused conductive elements may be coupled to the outer conductive element 58.

FIG. 3 illustrates another exemplary embodiment of a probe 60. The probe 60 comprises a center conductive element 62 and cylindrical conductive elements 64 and 68 surrounding the center conductive element 62 in an annular pattern. An outer conductive element 68 is disposed around the conductive elements 62, 64 and 66 to reduce the effect of any electrical noise and interference on the measurement of capacitance and/or separation. Again, the probe 60 may have a lesser or greater number of conductive elements based upon a desired range of measurement. Moreover, the conductive elements 64 and 68 may be selectively coupled to the center conductive element 62 for enhancing the resolution of the probe 60.

Figure 4:
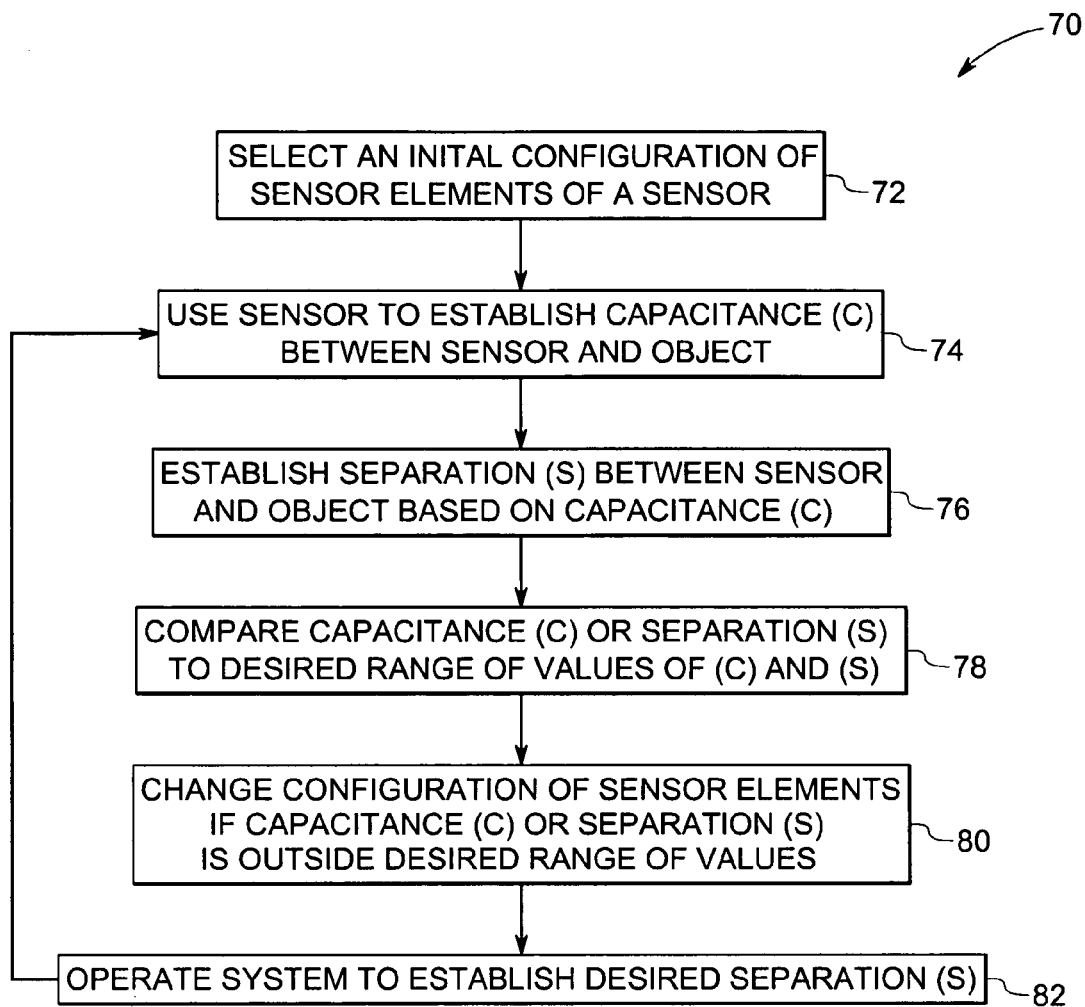
FIG. 4 is a flow chart illustrating a method of operating the sensor system of FIG. 1 in accordance with an exemplary embodiment of the present technique.

Referring generally to FIG. 4, an exemplary method 70 of operating the sensor system 10 of FIG. 1 is illustrated. Initially, an initial configuration of sensor elements of a sensor is selected for measuring a separation of an external object from the sensor, as represented by block 72. Next, at block 74 the measurement data from the sensor is used to establish a capacitance (C) between the sensor and the external object. As represented by block 76, the separation (S) between the sensor and the external object is established based upon the capacitance (C) sensed by the sensor. Next, the measured capacitance (C) or separation (S) is compared to a desired range of values of capacitance (C) and separation (S), as represented by block 78.

If the measured capacitance (C) or separation (S) is outside the desired range of capacitance (C) and/or separation (S) then the configuration of the sensor is modified, as represented by block 80. The configuration of the sensor may be modified by coupling more conductive elements to the initial configuration of the sensor. Alternatively, the configuration of the sensor may be changed by removing conductive elements from the initial configuration of the sensor. Finally, as represented by block 82, the system is operated by employing the modified configuration to establish the desired separation. As will be appreciated by those skilled in the art, the method steps from 74-82 may be iterated to achieve the desired separation between the sensor and the external object at different points in time.

Figure 5:
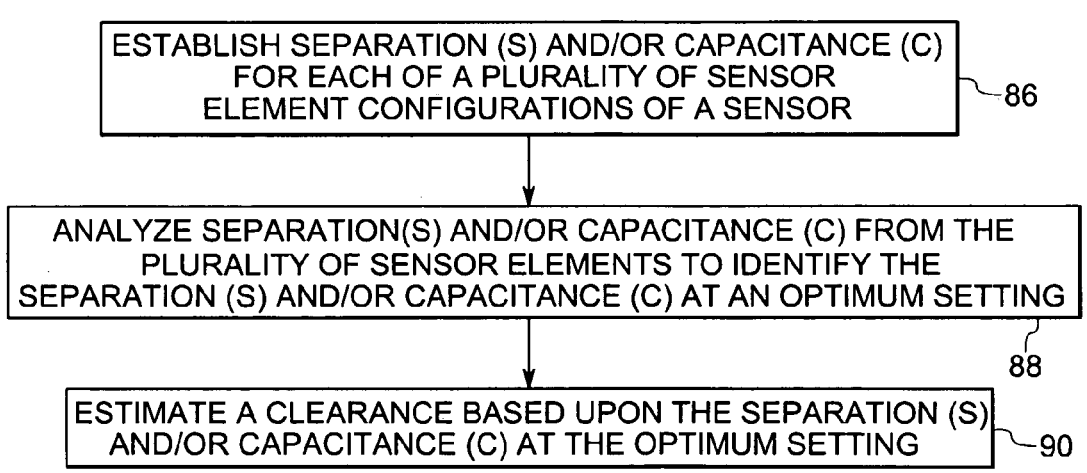
FIG. 5 is a flow chart illustrating a method of operating the sensor system of FIG. 1 in accordance with an exemplary embodiment of the present technique.

FIG. 5 illustrates another exemplary method 84 of operating the sensor system 10 of FIG. 1. In the illustrated method, separation (S) and/or capacitance (C) are established for each of a plurality of sensor element configurations, as represented by block 86. Next, the separation (S) and/or capacitance (C) as measured by the plurality of sensor element configurations are analyzed to identify the optimum separation (S) and/or capacitance (C) setting, as represented by block 88. The analysis of the measured separation (S) and/or capacitance (C) may be performed in real time. Alternatively, the analysis of the measured separation (S) and/or capacitance (C) may be performed off-line. Subsequently, as represented at block 90, a desired clearance or separation (S) is estimated based upon the measured separation (S) and/or capacitance (C) at the optimum setting.

The measurement technique described hereinabove provides an accurate measurement of the clearance between a stationary object and an adjacent moving part. The various aspects of the method described hereinabove have utility in applications where clearance measurements over a wide range of distance are required. For example, the technique described above may be used for measuring the clearance between a rotating component and a stationary component in an aircraft engine. As noted above, the method described here may be advantageous for measurements over a wide range of distances by selectively coupling the conductive elements of the sensor to tailor the area of the sensor to measure the distance between the objects.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A sensor system, comprising:
   a sensor configured to provide an output signal representative of a sensed parameter, wherein the sensor comprises a plurality of sensor elements that are configured to operate alone or in combination with one another to change a sensor area, and one configuration includes all of the sensor elements to define a maximum sensor area; and
   a control system coupled to the sensor, wherein the control system is configured to change a sensor area to adjust a sensitivity of the sensor based on the output signal representative of the sensed parameter,
   wherein the sensor comprises a capacitive probe.

2. The system of claim 1, wherein the sensor comprises a plurality of conductive elements.

3. The system of claim 2, wherein at least one of the plurality of conductive elements is configured to shield the sensor from noise and interference.

4. The system of claim 2, further comprising a plurality of switches configured to selectively couple each of the plurality of conductive elements to an output of the sensor.

5. The system of claim 2, wherein the plurality of conductive elements is arranged in an annular array.

6. The system of claim 1, wherein the sensed parameter comprises a capacitance between a sensing element of the sensor and an external object.

7. The system of claim 1, wherein the sensed parameter represents a distance between a sensing element of the sensor and an external object.

8. The system of claim 1, wherein the sensor comprises a plurality of mechanically configurable conductive elements.

9. The system of claim 8, wherein the control system is configured to selectively change a physical characteristic of each of the plurality of the mechanically configurable conductive elements.

10. The system of claim 9, wherein the physical characteristic comprises a surface area of each of the plurality of the mechanically configurable conductive elements.

11. The system of claim 1, wherein another configuration includes a predefined number of the sensor elements to define a minimum sensor area.

12. A sensor system, comprising:
    a sensor configured to provide an output signal representative of a distance between a sensor and an external object, wherein the sensor is configured to automatically change an area of the sensor based on the output signal representative of the distance between the sensor and the external object, wherein the sensor comprises a plurality of sensing areas that are selectively operable alone or in combination with one another to change the area, and one configuration of the sensor comprises all of the sensing areas to maximize sensitivity if the distance is greater than a reference value.

13. The system of claim 12, wherein the sensor comprises a plurality of sensing elements.

14. The system of claim 13, wherein the sensor comprises a plurality of switches configured to selectively couple each of the plurality of sensing elements to an output of the sensor.

15. The system of claim 14, comprising a control system configured to control each of the plurality of switches to selectively couple each sensing element to the output of the sensor.

16. The system of claim 12, wherein the sensor comprises a plurality of mechanically configurable conductive elements.

17. The system of claim 12, wherein the sensor system is configured to analyze a measured distance between the sensor and the external object through a plurality of sensor configurations and to select an optimum setting for estimation of a clearance between the sensor and the external object.

18. The system of claim 12, wherein another configuration of the sensor comprises a predefined number of the sensing areas to minimize sensitivity if the distance is less than another reference value.

19. A multi-range sensor comprising:
    a plurality of ring-shaped conductive elements configured to sense a parameter, wherein the ring-shaped conductive elements are affanged concentrically about one another, and the ring-shaped conductive elements are configured to operate alone or in combination with one another; and
    a plurality of switches configured to selectively couple each of the plurality of ring-shaped conductive elements to an output of the sensor in various configurations alone or in combination with one another, wherein one configuration comprises all of the ring-shaped conductive elements to define a maximum sensor area,
    wherein the sensed parameter comprises a capacitance.

20. The sensor of claim 19, wherein the plurality of ring-shaped conductive elements is affanged in a pre-determined pattern.

21. The sensor of claim 19, wherein the plurality of switches comprise one of solid-state switches, mechanical relays or radio frequency micro electromechanical systems switches.

22. The sensor of claim 19, wherein at least one of the plurality of ring-shaped conductive elements is configured to shield the sensor from noise and interference.

23. The system of claim 19, wherein another configuration includes a predefined number of the ring-shaped conductive elements to define a minimum sensor area.

* * * * *